(12) United States Patent
Hirade

(10) Patent No.: US 10,168,354 B1
(45) Date of Patent: Jan. 1, 2019

(54) SCANNING PROBE MICROSCOPE

(71) Applicant: Shimadzu Corporation, Kyoto (JP)

(72) Inventor: Masato Hirade, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 15/924,713

(22) Filed: Mar. 19, 2018

(51) Int. Cl.
*G01Q 20/02* (2010.01)

(52) U.S. Cl.
CPC .................. *G01Q 20/02* (2013.01)

(58) Field of Classification Search
USPC .................................... 850/6, 5, 33
See application file for complete search history.

(56) References Cited

U.S. PATENT DOCUMENTS

2009/0032706 A1* 2/2009 Prater .................... G01Q 10/04
250/307

FOREIGN PATENT DOCUMENTS

JP      2012-225722 A    11/2012
JP      2014-211372 A    11/2014

* cited by examiner

*Primary Examiner* — Kiet T Nguyen
(74) *Attorney, Agent, or Firm* — Maier & Maier, PLLC

(57) ABSTRACT

In a scanning probe microscope including a condensing optical system which includes a laser beam source, a collimator lens and a focus lens, a cantilever, and a detector, the condensing optical system including a cylindrical lens barrel having the laser beam source fixed to one end thereof, and a cylindrical lens mount which is coaxially disposed inside the lens barrel and has the collimator lens fixed to an end portion close to the laser beam source and the focus lens fixed to the opposite end portion, ring-shaped elastic members and are attached to the outer circumferential surface of the lens mount.

4 Claims, 4 Drawing Sheets

SCANNING PROBE MICROSCOPE

FIELD

The present invention relates to a scanning probe microscope (hereinafter, abbreviated as SPM) such as an interatomic force microscope (hereinafter, abbreviated as AFM) or a scanning tunnel microscope (STM).

BACKGROUND

The SPM is an apparatus which scans a probe located in proximity to a surface of a sample, detects the action (interatomic force, tunnel current, or the like) acting between the probe and the sample, and can observe a shape of the surface of the sample by imaging the action. FIG. 4 is a diagram illustrating an example of an overall schematic configuration of the AFM which is one type of the SPM. An AFM (SPM) 1 includes a stage 11, a cantilever 12, a probe 13, a laser beam source (laser diode) 14, a collimator lens 15, a focus lens 16, a beam splitter 17, a mirror 18, a detector 19, and an optical microscope 20 (for example, refer to Patent Literatures 1 and 2).

A sample S which is an object of a surface observation is placed on the stage 11. The stage 11 can be driven in a height direction (Z direction) and a sample surface direction (XY direction) by a tube scanner (not illustrated) which is a driving mechanism, thereby moving the sample S in a three-dimensional (XYZ) direction.

The probe 13 is attached to a free end side of the cantilever 12. When the probe 13 approaches the surface of the sample S, interatomic force (attractive force or repulsive force) acts between the sample S and the probe 13. A force which tends to deflect the cantilever 12 is applied by the interatomic force.

On the other hand, a condensing optical system 21 including the laser beam source 14, the collimator lens 15, and the focus lens 16 is integrally held inside a cylindrical lens barrel 22, and the laser beam emitted from the laser beam source 14 is collected by the collimator lens 15 and converted into a parallel beam. Thereafter, the laser beam is condensed by the focus lens 16. The laser beam condensed in this manner is irradiated on a reflecting surface of the cantilever 12 and reflected. Further, the laser beam is reflected by the mirror 18 and guided to the detector 19.

For example, a quadrant photodiode is used as the detector 19. When the position of the reflected beam incident on the detector 19 changes due to deflection of the cantilever 12, the detector 19 can detect the variation and output the detected variation as a feedback signal. Further, by performing the feedback control on the drive mechanism (a Z-axis adjustment mechanism of a tube scanner) using the feedback signal so that a deflection amount of the cantilever 12 is kept constant, that is, the distance between the probe 13 and the surface of the sample S is kept constant, the intensity of the feedback signal becomes a change amount which reflects the unevenness of the sample S. Therefore, by forming an image on the basis of the feedback signal, the unevenness of the surface of the sample S is imaged.

Incidentally, after the laser beam passes through the focus lens 16, an optical axis direction of the laser beam is bent by the beam splitter 17 so that an optical axis O of the optical microscope 20 and an optical axis L of the laser beam overlap with each other.

The optical microscope 20 is used when a user of the AFM (SPM) 1 observes the sample S. However, in addition to this, the optical microscope 20 is also used when adjusting the irradiation position of the laser beam from the condensing optical system 21 to the cantilever 12.

In other words, the condensing optical system 21 is assembled so that the respective elements of the laser beam source 14, the collimator lens 15, and the focus lens 16 are integrated in the cylindrical lens barrel 22 in a state in which the optical axis is adjusted. The adjustment operation inside the lens barrel 22 is performed by a technician of the apparatus manufacturer in advance and is fixed so that a positional relation between the elements does not change after adjusted once. The lens barrel 22 is supported by a microscope head (not illustrated) serving as a support, and is attached to a position adjustment mechanism (not illustrated) which moves the entire lens barrel 22 in a two-dimensional direction (or a three-dimensional direction also including the optical axis L direction) orthogonal to the optical axis L.

By moving the lens barrel 22 (the condensing optical system 21) in the two-dimensional (or three-dimensional) direction using a laser beam adjusting knob (not illustrated) of the position adjustment mechanism, while looking into the optical microscope 20, the user of the AFM 1 can perform the adjustment which matches the irradiation position of the laser beam with the reflecting surface of the cantilever 12. Incidentally, the position adjustment of the lens barrel 22 by the user is performed by moving the entire lens barrel 22, and adjustment of the optical axis between the elements inside the lens barrel 22 on the user side is not performed as described above.

Here, the internal structure of the condensing optical system 21 of the AFM (SPM) 1 and the adjustment operation inside the condensing optical system 21 performed by the technician of the apparatus manufacturer will be described. In the ideal condensing optical system 21 of the AFM 1, since the condensing properties of the laser beam affect the performance of the AFM 1, when the user performs the adjustment so that the laser beam is irradiated on the reflecting surface of the cantilever 12 by the aforementioned laser beam adjusting knob, it is desirable that an irradiated spot area be as small as possible.

In order to construct the aforementioned ideal condensing optical system 21, adjustment is performed by a technician of the apparatus manufacturer so that a beam emitting point 14a (see FIG. 5) of the laser beam source 14 coincides with the center of the collimator lens 15 on the optical axis L, and it is necessary that the distance between the laser beam source 14 and the collimator lens 15 can be adjusted so that ideal collimating beam (parallel beam) is formed in the lens barrel 22.

For that purpose, if a plurality of fine adjustment mechanisms is provided inside the condensing optical system 21 so that the distance between the elements and the angle of the elements can be freely adjusted, the ideal condensing optical system 21 can be reliably constructed.

However, in recent years, it has been required to make the size of the entire SPM (AFM) apparatus compact as much as possible. For example, also regarding the condensing optical system 21 which condenses the laser beam on the reflecting surface of the cantilever 12, since an attachment space thereof is specifically limited to about 3 to 5 cm, it is practically difficult to incorporate a plurality of fine adjustment mechanisms. Furthermore, since it is required to reduce not only the size of the apparatus but also the cost, it is desirable to provide a simplified configuration without immoderately providing an adjustment mechanism.

For this reason, in order to minimize the adjustment mechanism in the condensing optical system 21, a simple adjustment mechanism for adjusting only the position of the collimator lens 15 on the optical axis is adopted at present.

Here, FIG. 5 is a cross-sectional view illustrating a condensing optical system 21 equipped with a conventional simple adjustment mechanism. The condensing optical system 21 includes the lens barrel 22 which holds the laser beam source 14, the collimator lens 15, and a lens mount 23 which holds the focus lens 16.

The lens barrel 22 has a hollow cylindrical shape, and is designed on the premise that each optical component is arranged so that the axis of the central axis of the lens barrel 22 becomes the optical axis L of the condensing optical system 21.

That is, the laser beam source 14 is attached to one end of the lens barrel 22, and the beam emitting point 14a of the laser beam source 14 is fixed so as to be located on the optical axis L. Incidentally, a female screw 24 is engraved on the inner circumferential surface of the lens barrel 22.

The lens mount 23 forms a hollow cylindrical body, and a male screw 25 engraved on the outer circumferential surface thereof is screwed with the female screw 24 of the lens barrel 22, and the axis of the center axis of the lens mount 23 and the axis of the lens barrel 22 are designed to overlap with each other in a state in which the male screw 25 and the female screw 24 are screwed together.

Therefore, the axis of the central axis of the lens mount 23 is also designed to coincide with the optical axis L, and the collimator lens 15 is fixed to one end (the end portion on the side close to the laser beam source 14) in the tube of the lens mount 23, and the focus lens 16 is fixed to the other end thereof with an adhesive. The centers of the collimator lens 15 and the focus lens 16 are arranged on the optical axis L in a state in which the lens mount 23 is screwed to the lens barrel 22 in this manner.

Further, the screwing position of the male screw 25 with respect to the female screw 24 is adjusted by a technician of the apparatus manufacturer so that the position of the beam emitting point 14a of the laser beam source 14 in the direction of the optical axis L becomes a focal point of the collimator lens 15. As a result, the collimating beam (parallel beam) can be emitted by the collimator lens 15. After completion of the position adjustment of the collimator lens 15, the position of the lens mount 23 is fixed with respect to the lens barrel 22 by a set screw 26 passing through the side wall of the lens barrel 22 from the outer side of the lens barrel 22.

After completion of adjustment of the lens mount 23, laser beam (collimating beam) enters the focus lens 16, and the laser beam that has passed through the focus lens 16 is condensed at the focal position of the focus lens 16 on the optical axis L. Further, the focal position is set near the reflecting surface of the cantilever 12.

As a result, the user moves the lens barrel 22 using the laser beam adjusting knob so that the reflecting surface of the cantilever 12 comes to the focal position (or on the optical axis L in the vicinity of the focal point), thereby making it possible to perform measurement with a high S/N ratio.

[Patent Literature 1] JP-A-2012-225722
[Patent Literature 2] JP-A-2014-211372

SUMMARY

The condensing optical system. 21 is based on the premise that the lens barrel 22 and the lens mount 23 are disposed so that the axes thereof coincide with each other, and the lens center of the collimator lens 15 and the beam emitting point 14a of the laser beam source (laser diode) 14 are fixed in a state of being adjusted to exist on the optical axis L.

However, as described above, in the condensing optical system 21, in order to enable the position adjustment of the collimator lens 15 in the direction of the optical axis L, the lens barrel 22 and the lens mount 23 are screwed together by the female screw 24 and the male screw 25. In general, since a machining accuracy of the screw portion is not sufficient as compared with machining of a flat surface, machining of screw grooves results in rattling in the screw portion. Further, when the lens barrel 22 and the lens mount 23 are fixed by set screw 26, the positional deviation is likely to occur, and when rattling occurs in the screw groove, the positional deviation is more likely to occur.

FIGS. 6 and 7 are schematic diagrams illustrating a state in which a positional deviation occurs inside the condensing optical system 21. Incidentally, FIG. 6 illustrates a state in which the axis of the center axis of the lens mount 23 is displaced in parallel with respect to the axis of the central axis of the lens barrel 22 and the center of the collimator lens 15 deviates from the optical axis L, and FIG. 7 illustrates a state in which the axis of the lens mount 23 is inclined with respect to the axis of the lens barrel 22.

In either case, an ideal collimating beam cannot be obtained, and as a result, the spot area at the focal point formed by the focus lens 16 expands more than the ideal state.

Therefore, since technicians of apparatus manufacturers need to perform an adjustment operation so as not to cause such troubles, skill is required for adjustment, and time and labor are also required.

In this regard, an object of the invention is to provide an SPM capable of easily performing the adjustment of the optical axis of elements inside the condensing optical system 21. Further, another object of the invention is to provide an SPM having a structure in which the axis deviation of the optical axis is hard to occur in the condensing optical system 21.

A scanning probe microscope according to the invention made to solve the above-mentioned problems is a scanning probe microscope including: a condensing optical system which includes a laser beam source, a collimator lens configured to convert laser beam from the laser beam source into parallel beam, and a focus lens configured to condense the laser beam converted into the parallel beam; a cantilever provided with a reflecting surface which reflects the laser beam from the condensing optical system; and a detector which detects the laser beam reflected by the cantilever. The condensing optical system includes a cylindrical lens barrel having the laser beam source fixed to one end thereof, and a cylindrical lens mount which is coaxially disposed inside the lens barrel and has the collimator lens fixed to an end portion on a side close to the laser beam source and the focus lens fixed to an end portion on an opposite side. The lens mount is configured to be movable in an axis direction with respect to the lens barrel by a screw groove engraved on an outer circumferential surface of the lens mount and an inner circumferential surface of the lens barrel. A ring-shaped elastic member is attached between the outer circumferential surface of the lens mount and the inner circumferential surface of the lens barrel.

According to the invention, in the condensing optical system, the ring-shaped elastic member is attached between the outer circumferential surface of the lens mount and the inner circumferential surface of the lens barrel screwed with the screw groove. Since it is possible to uniformly urge the whole circumferential surface by the elastic member, it is possible to absorb rattling caused by the machining precision of the screw and to facilitate axis aligning at the time of adjustment operation. Further, since the lens mount can be fixed by the urging force of the elastic member, it is not necessary to fix the lens mount by a set screw as in the related art.

In the above invention, the elastic member may be attached to both sides of the screw groove in the middle along an axis direction.

Accordingly, since the lens mount is urged by the elastic member at both ends, the axis aligning adjustment can be further facilitated.

In the above invention, the outer circumferential surface of the lens mount and the inner circumferential surface of the lens barrel may be flat circumferential surfaces in which a side closer to the laser beam source has a smaller diameter than a portion in which the screw groove is formed, and one of the elastic members may be attached to the small diameter portion.

Thus, when the lens mount is screwed into the lens barrel, the elastic member on the side close to the laser beam source does not come into contact with the screw groove (female screw) of the lens barrel. Therefore, when the lens mount is screwed at the time of adjustment, the elastic member is hard to be scratched.

Further, in the invention, the outer circumferential surface of the lens mount and the inner circumferential surface of the lens barrel may have a three-step structure having a small diameter on a side close to the laser beam source, an intermediate diameter at the center, and a large diameter on a side far from the laser beam source, the screw groove may be engraved in the intermediate diameter portion, the small diameter portion and the large diameter portion may be flat surfaces, and the elastic member may be attached to the small diameter portion and the large diameter portion.

Since this prevents the large diameter flat surface from being erroneously screwed to the intermediate diameter screw groove, neither elastic member on either side is scratched.

DETAILED DESCRIPTION OF THE DRAWINGS

Figure 1:
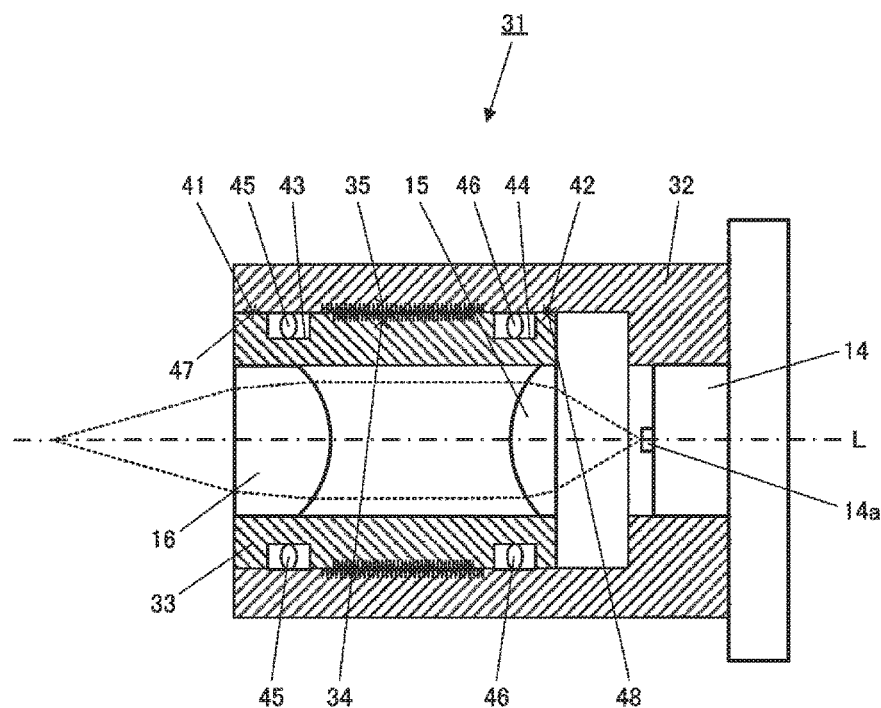
FIG. 1 is a cross-sectional view illustrating a configuration of a condensing optical system of an SPM according to the invention.

Hereinafter, embodiments of the invention will be described with reference to the drawings. FIG. 1 is a cross-sectional view illustrating a configuration of a condensing optical system 31 in an SPM which is an embodiment of the invention.

Figure 5:
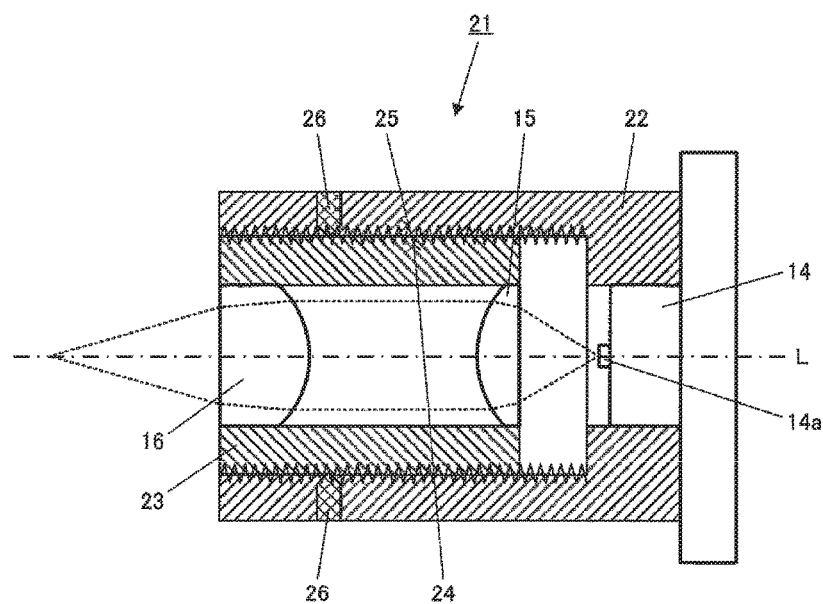
FIG. 5 is a cross-sectional view illustrating a configuration of a conventional condensing optical system.
Figure 6:
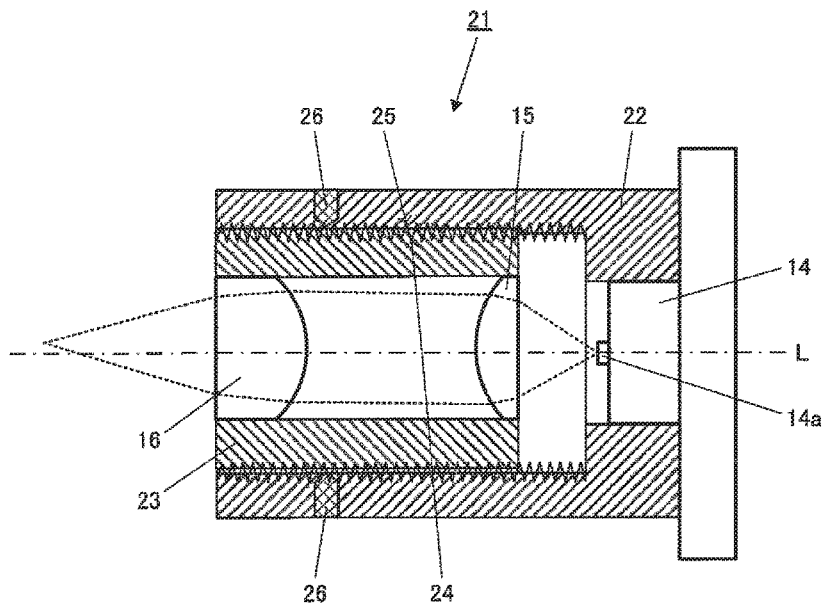
FIG. 6 is a schematic diagram illustrating an example of an axis deviation state of the condensing optical system.
Figure 7:
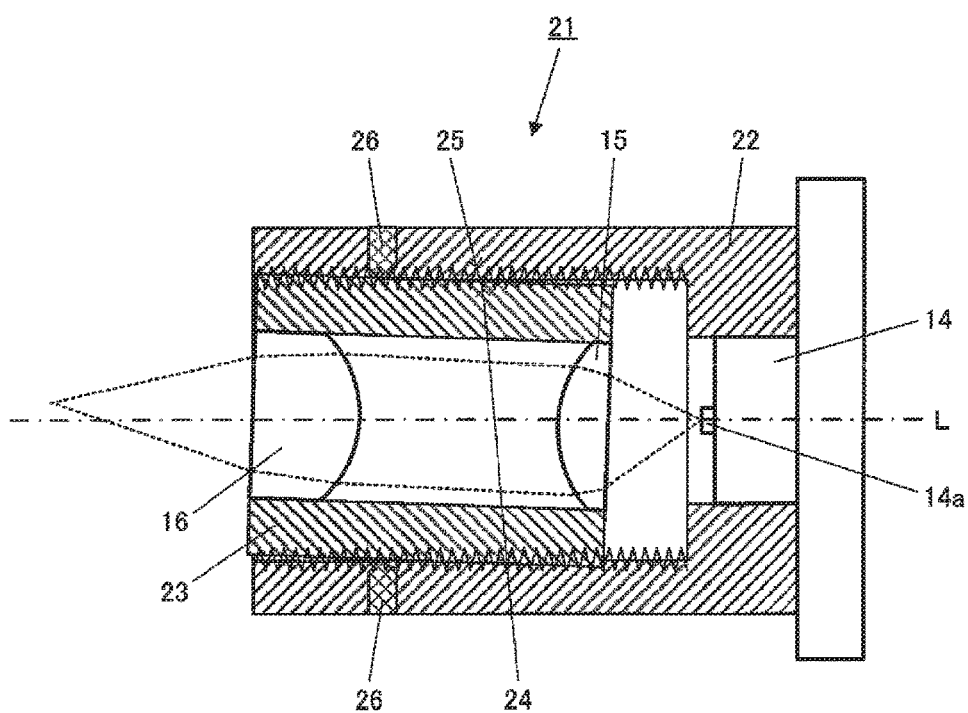
FIG. 7 is a schematic diagram illustrating another example of the axis deviation state of the condensing optical system.

Incidentally, in the configuration of the condensing optical system 31, by giving the same reference numerals to the same constituent components as those described with reference to FIG. 5, a part of the description is omitted.

Figure 4:
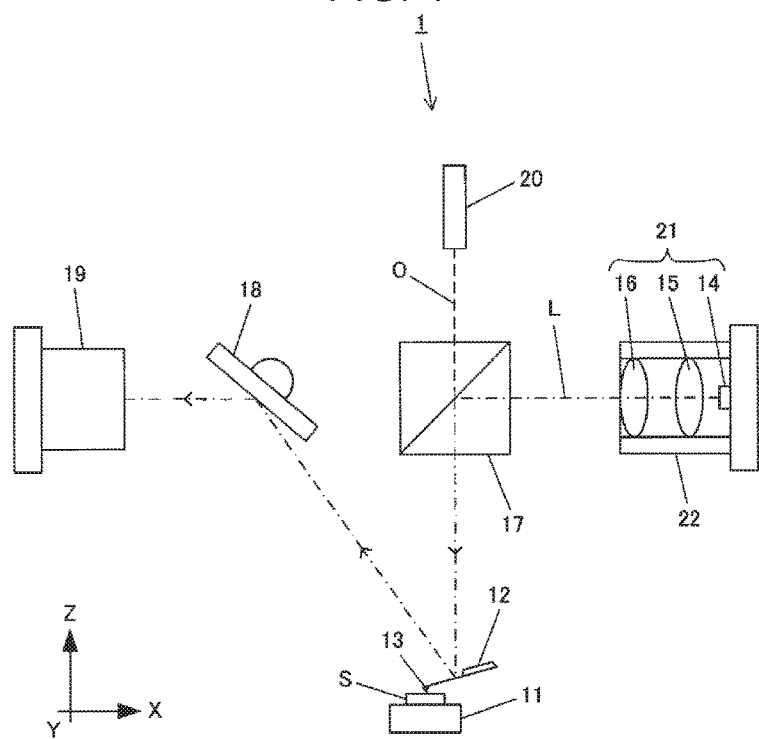
FIG. 4 is a schematic diagram illustrating an example of an overall configuration of an AFM.

In addition, since the configuration of the SPM other than the condensing optical system 31 is similar to that illustrated in FIG. 4, the description will be omitted by referring to FIG. 4.

Similarly to the conventional condensing optical system 21, the condensing optical system 31 of the SPM according to the invention is configured to include a cylindrical lens barrel 32 that holds a laser beam source 14 at one end thereof, and a cylindrical lens mount 33 that holds a collimator lens 15 at one end (an end portion on a side close to the laser beam source 14) and holds a focus lens 16 at the other end.

The lens barrel 32 and the lens mount 33 are required to perform axis aligning adjustment so that a beam emitting point 14a of the laser beam source 14, and the centers of the lenses of the collimator lens 15 and the focus lens 16 are disposed on the optical axis L. However, devises for making the adjustment operation easier than before are performed.

That is, on the outer circumferential surface of the lens mount 33, flat surfaces 41 and 42 are formed in the vicinity of both ends thereof along the axis direction, and male screws 35 are engraved in the middle between the flat surfaces 41 and 42. Grooves 43 and 44 are formed on the flat surfaces 41 and 42, and O-rings 45 and 46 serving as elastic members are fitted into the grooves.

Further, the lens barrel 32 is provided with a hollow space of an inner diameter dimension capable of screwing the lens mount 33 except for one end portion to which the laser beam source 14 is attached. Female screws 34 for being screwed with the male screw 35 along the axis direction are engraved on the inner circumferential surface of the hollow portion. Both ends of the hollow portion are flat surfaces 47 and 48, and the O-rings 45 and 46 of the lens mount 33 come into contact with the flat surfaces 47 and 48 so that the urging force acts.

Since the O-rings 45 and 46 are not attached for the purpose of sealing the lens barrel 32 and the lens mount 33, it is not always necessary to set the contact surface as a flat surface for the purpose of imparting an urging force, and there is no problem even when the contact surface is set as a screw groove. However, if the female screw 34 and the O-rings 45 and 46 continue to come into contact with each other, the surfaces of the O-rings 45 and 46 are likely to be scratched. Therefore, as in the present embodiment, it is preferable to set the contact surfaces as the flat surfaces 47 and 48.

Next, the adjustment operation of the lens barrel 32 and the lens mount 33 will be described. Incidentally, as a prerequisite for this adjustment operation, there are needs for two axis aligning operations, that is, an operation for fixing the beam emitting point 14a of the laser beam source 14 to coincide with the axis of the lens barrel 32, and an operation for fixing the collimator lens 15 and the focus lens 16 to make the centers of the lenses of the collimator lens 15 and the focus lens 16 coincide with the axis of the lens mount 33. However, these operations are operations for attaching the elements to a flat machining surface with high machining accuracy in the lens barrel 32 and the lens mount 33, and as in the related art, a technician of the apparatus manufacturer can accurately perform adjustment using an adjustment jig.

Therefore, it is assumed here that the adjustment of the attachment positions of the respective elements to the lens barrel 32 or the lens mount 33 has been completed.

An object of the invention is to perform the position adjustment of the lens mount 33 with respect to the lens barrel 32, more specifically, to make the axes thereof coincide with each other in a state in which the lens mount 33 and the lens barrel 32 are screwed together so that the beam emitting point 14a of the laser beam source 14, and the centers of the collimator lens 15 and the focus lens 16 are arranged on one axis L, and to perform adjustment so that the beam emitting point 14a of the laser beam source 14 coincides with the focal position of the collimator lens 15 to form ideal collimating beam.

In the condensing optical system. 31, when the technician of the apparatus manufacturer performs adjustment, the lens mount 33 is screwed into the lens barrel 32 in a state in which the O-rings 45 and 46 are attached. At this time, the O-rings 45 and 46 are brought into contact with the inner circumferential surface of the lens barrel 32 and are screwed into the inner circumferential surface, while being uniformly urged from the surroundings. When the machining precision of the screw groove portion is not sufficient, rattling occurs, but the rattling is absorbed by the O-rings 45 and 46 and is not greatly urged. Accordingly, it is possible to perform the adjustment of simply making the axes coincide with each other to dispose the respective elements on the optical axis L.

Modified Embodiment

Figure 2:
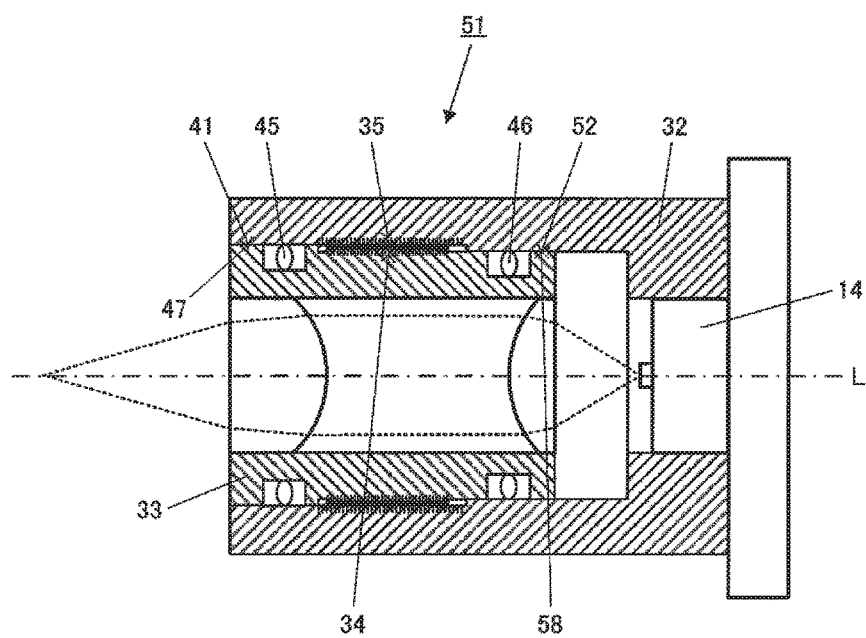
FIG. 2 is a cross-sectional view similar to FIG. 1 illustrating another configuration of the condensing optical system of the invention.

FIG. 2 is a cross-sectional view illustrating the configuration of a condensing optical system 51 of an SPM according to another embodiment of the invention. Here, the inner diameters of the flat surface 58 with which the O-ring 46 on the side close to the laser beam source 14 comes into contact and the corresponding flat surface 52 are set to be smaller by one step than the formation surface of the female screw 34 and the male screw 35.

In this way, when the lens mount 33 is screwed into the lens barrel 32, the O-ring 46 on the side close to the laser beam source 14 can be inserted to the position of the flat surface 58 without coming into contact with the female screw 34. Accordingly, the surface of the O-ring 46 can be made less scratched, including the time of adjustment. Incidentally, since the O-ring 45 is in contact with the flat surface 47 on the front side of the female screw 34, no step is provided in this embodiment.

Figure 3:
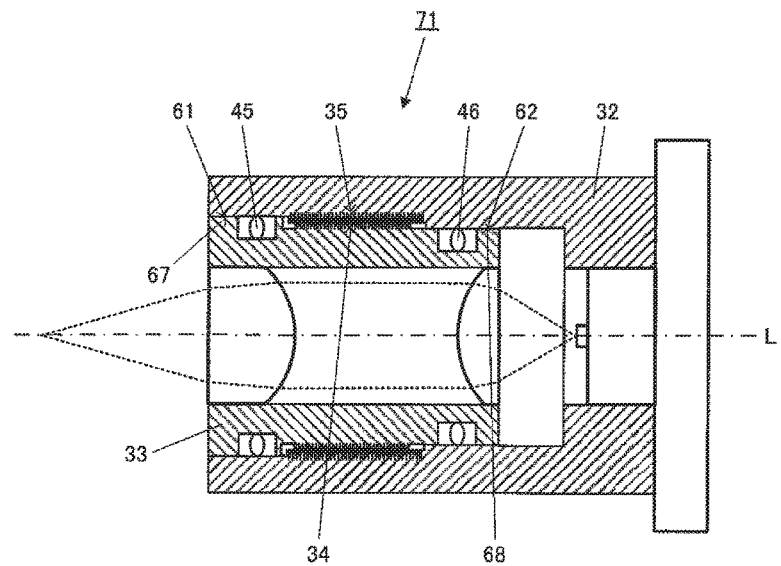
FIG. 3 is a cross-sectional view similar to FIG. 1 illustrating still another configuration of the condensing optical system of the invention.

FIG. 3 is a cross-sectional view illustrating a configuration of a condensing optical system 71 of an SPM according to still another embodiment of the invention. In this case, the inner diameters of the upper and lower flat surfaces 62 and 68 with which the O-ring 46 on the side close to the laser beam source 14 comes into contact are made to be smaller by one step than the formation surface of the female screw 34 and the male screw 35, but also the inner diameters of the upper and lower flat surfaces 61 and 67 on the side far from the laser beam source 14 are made to be larger by one step than the formation surface of the female screw 34 and the male screw 35. Thus, the outer circumferential surface of the lens mount 33 and the inner circumferential surface of the lens barrel 32 have a three-step structure. Accordingly, it is possible to prevent the lens mount 33 from being excessively screwed in and the O-ring 45 from erroneously coming into contact with the female screw 34.

In each of the above-described embodiments, the O-rings 45 and 46 are provided at both ends of the lens mount 33, respectively. However, even in a case where the O-rings 45 and 46 are provided at either end of the lens mount 33, it is easy to sufficiently easily perform the adjustment operation of the axis aligning as compared to a conventional structure in which no O-ring is provided.

The invention can be applied to a scanning probe microscope such as an interatomic force microscope and a scanning type tunnel microscope.

The invention claimed is:

1. A scanning probe microscope comprising:
   a condensing optical system which includes a laser beam source, a collimator lens configured to convert laser beam from the laser beam source into parallel beam, and a focus lens configured to condense the laser beam converted into the parallel beam;
   a cantilever provided with a reflecting surface which reflects the laser beam from the condensing optical system; and
   a detector which detects the laser beam reflected by the cantilever,
   the condensing optical system including a cylindrical lens barrel having the laser beam source fixed to one end thereof, and a cylindrical lens mount which is coaxially disposed inside the lens barrel and has the collimator lens fixed to an end portion on a side close to the laser beam source and the focus lens fixed to an end portion on an opposite side,
   the lens mount being configured to be movable in an axis direction with respect to the lens barrel by a screw groove engraved on an outer circumferential surface of the lens mount and an inner circumferential surface of the lens barrel,
   wherein a ring-shaped elastic member is attached between the outer circumferential surface of the lens mount and the inner circumferential surface of the lens barrel.

2. The scanning probe microscope according to claim 1, wherein the elastic member is attached to both sides of the screw groove in the middle along the axis direction.

3. The scanning probe microscope according to claim 2, wherein the outer circumferential surface of the lens mount and the inner circumferential surface of the lens barrel are flat circumferential surfaces in which a side closer to the laser beam source has a smaller diameter than a portion in which the screw groove is formed, and
   one of the elastic members is attached to the small diameter portion.

4. The scanning probe microscope according to claim 2, wherein the outer circumferential surface of the lens mount and the inner circumferential surface of the lens barrel have a three-step structure having a small diameter on a side close to the laser beam source, an intermediate diameter at the center, and a large diameter on a side far from the laser beam source, the screw groove is engraved in the intermediate diameter portion, the small diameter portion and the large diameter portion are flat surfaces, and the elastic member is attached to the small diameter portion and the large diameter portion.

* * * * *